United States Patent [19]

Mitchell

[11] Patent Number: 5,533,855
[45] Date of Patent: Jul. 9, 1996

[54] BALE TRANSPORTER

[76] Inventor: David Mitchell, Church Farm, Winfarthing, Diss, Norfolk IP22 2ED, United Kingdom

[21] Appl. No.: 204,314
[22] PCT Filed: Sep. 16, 1992
[86] PCT No.: PCT/GB92/01696
    § 371 Date: Aug. 16, 1994
    § 102(e) Date: Aug. 16, 1994
[87] PCT Pub. No.: WO93/05642
    PCT Pub. Date: Apr. 1, 1993

[30] Foreign Application Priority Data

Sep. 16, 1991 [GB] United Kingdom ............ 9119750

[51] Int. Cl.⁶ ............................................. A01D 90/08
[52] U.S. Cl. ............................ 414/470; 298/18; 414/24.5; 414/483
[58] Field of Search ..................... 298/18; 414/24.5, 414/24.6, 111, 470; 786/483

[56] References Cited

U.S. PATENT DOCUMENTS

| 3,974,926 | 8/1976 | Kopaska | 414/24.5 |
| 4,072,241 | 2/1978 | Parker et al. | |
| 4,242,031 | 12/1980 | McMullen | 414/470 |
| 4,500,242 | 2/1985 | Beikman | 414/24.5 |
| 5,071,304 | 12/1991 | Godfrey | 411/111 |
| 5,165,836 | 11/1992 | Shonka | 414/483 X |

FOREIGN PATENT DOCUMENTS

| 5892/54 | 6/1955 | Australia . |
| 15455/76 | 1/1978 | Australia . |
| 73460/81 | 2/1982 | Australia . |
| 88712/82 | 4/1983 | Australia . |
| 68080/87 | 8/1987 | Australia . |
| 1082928 | 8/1980 | Canada . |
| 0350214 | 1/1990 | European Pat. Off. . |
| 1569416 | 6/1980 | United Kingdom . |

Primary Examiner—David A. Bucci
Assistant Examiner—Janice L. Krizek
Attorney, Agent, or Firm—Larson and Taylor

[57] ABSTRACT

A self-loading bale transporter (1) for agricultural use is particularly adapted for use with round bales (20). The self-loading bale transporter includes a support (2) which is movable between a position in which bales (20) may be loaded and unloaded, and a position for transporting the bales. The bale transporter (1) is further provided with loading arms which are capable of clamping the bale (20) onto the support during loading and transportation, and then releasing the bale (20) when it is unloaded.

27 Claims, 7 Drawing Sheets

BALE TRANSPORTER

This invention relates to a bale transporter for agricultural use and in particular, to a self-loading and unloading bale transporter, particularly adapted for use with round bales.

Bale transporters are used to transport bales of straw, hay etc. from the fields in which they are produced to the sites at which they are to be stored. Bale transporters are coupled in use to the usual supply of power and drive for agricultural purposes, e.g. a tractor. To minimise the number of personnel needed to transport the bales it is particularly desirable to have a bale transporter which is capable of self-loading and unloading.

A particular problem of self-load bale transporters is that the bale transporter must be able to load and unload the bales without the extra weight of the bales being lifted causing the bale transporter to topple over.

Furthermore the bale transporter should not damage the bales while they are being loaded and unloaded.

This invention thus seeks to provide a bale transporter which is compact and is able to self-load with reduced risk of toppling over.

According to the present invention there is provided a bale transporter capable of self-loading and unloading of bales, which is adapted to be coupled to means for supplying power and drive and comprises:

a support which is movable between a first (transportation) position in which it is able to support a bale during transportation and a second (loading/unloading) position in which a bale may be loaded on to or unloaded from the support; and loading means capable of clamping a bale on the ground to the support when it is in the second position, of holding the bale in position on the support when it is in the first position, and of releasing the bale when it is unloaded from the support in the second position.

For movement between the first and second positions the support is preferably pivotally mounted so as to be swingable between the positions. The transporter should be provided with suitable means for moving the support between the first and second positions, which when the support is pivotally mounted can take the form of a rack and pinion arrangement or preferably a piston/cylinder arrangement.

The means for supplying power and drive to the transporter may form an integral part of the transporter or preferably are provided by a tractor to which the transporter may be coupled.

Where the transporter is to be coupled to a tractor during use it is preferred that the coupling allows the end of the transporter (support) nearest the tractor to move laterally with respect to the tractor. A coupling allowing for lateral rotation, for example by an angle of 40°–60° (e.g. by 45°–50°), of the front end of the transporter with respect to the tractor is particularly suitable as it allows the transporter to be more easily aligned with a bale to be loaded. The transporter is therefore preferably provided with a rotatable coupling, via which it may be coupled to the means for supplying power and drive, e.g. a tractor. The rotatable coupling is preferably movable in position in a direction perpendicular to the ground. When the transporter is transporting bales the coupling should be in a high position clear of the ground, preferably substantially in line with the centre of the tractor tyre. This enables good clearance to be obtained by the transporter when carrying bales. However, for reasons which will be explained later, during loading it is preferable that the coupling be lowered nearer the ground.

The way in which the support for the bales is mounted is important to the balance of the transporter when bales are being loaded onto the transporter. The support for the bales is preferably pivotably mounted on a first, higher, pivot point on an end frame of the transporter and on a second, lower, pivot point at the coupling point of the support to the tractor. This results in the combined centre of gravity of the bales and support being nearer to the axis of rotation of the support when the bales have been loaded onto the support and thus the transporter is less likely to overturn when the support is moved back to the transportation position.

The difference in the height of the pivot points enables the front of the transporter to be swung outwards with respect to the tractor as the support pivots towards the loading/unloading position and thus contributes to the balancing of the unaligned transporter. This is a particularly preferred aspect of the invention as it allows the width of the transporter to be kept to a minimum.

The first pivot point is preferably as high as possible. This enables the forces exerted on the front and rear of the transporter in a fully loaded machine to be balanced more easily when in the loading/unloading position by using the weight of the already loaded bales to provide a counter balance force.

This effect may be enhanced by the positioning of a further support for the bales behind the second pivot point on the end frame of the transporter thus further improving the stability of the transporter.

The second pivot point must be as low as possible in its pivoting position so as to enable the overall centre of gravity of the transporter to be kept as low as possible.

Thus, the mounting of the support is preferably such that in all positions the centre of gravity of the support is maintained as centrally as possible.

The support is preferably capable of supporting more than one bale. The support may be provided with one or more support surface, with each support surface being able to support one or a plurality of bales. The support may then be capable of moving to more than one loading and unloading position (the second position) and in each of those positions a bale may be loaded or unloaded on to or from a support surface. In a preferred embodiment of the invention the support is divided so as to have two parallel extending support surfaces and the support is able to be pivoted from a central first position, in which the bales are supported for transportation on the support surfaces lying substantially horizontally, in one direction to a second position in which bales may be loaded on to or unloaded from one of the support surfaces which is now tilted to the ground and in an opposing second direction, in which bales may be unloaded from or loaded on to the other support surface which is now in turn tilted downwards.

The loading means may take the form of a loading arm, preferably pivotally mounted. For loading a bale, the loading arm, when the support is in the second position, may be pivoted towards the support so as to clamp a bale positioned in the pivoting path on to the support. For unloading, the loading arm may be pivoted outwardly from a position in which it holds the bale in place on the support so as to release the bale and allow it to move off the support on to the ground when the support is in the second position.

Instead of a single loading bar individual bars may be provided for each bale. This arrangement minimises the possibility of damage to the bales in the loading process by ensuring that each bale is only loaded and unloaded once.

The bale transporter is particularly suited to the transportation of round bales which due to their ability to roll allows for ease of loading onto and unloading from the baler. However, the bale transporter of this invention may also be used to pick up and transport bales with different shapes, for example square bales.

According to the present invention there is also provided a method of transporting a bale using a bale transporter having (a) a support on to and from which bales can be loaded and unloaded and which is able to support the bale whilst it is being transported and (b) loading means, which method comprises:

loading the bale by aligning the transporter with the bale and moving the support to a loading/unloading position in which the loading means may be moved so as to clamp the bale on to the support; moving the support to a transportation position in which the bale is supported by the support and held by the loading means and may be transported; and unloading the bale by moving the support to the loading/unloading position and moving the loading means so as to release the bale.

For a better understanding of the invention and to show how the same may be put into effect reference will now be made to the accompanying drawings in which.

Figure 1:
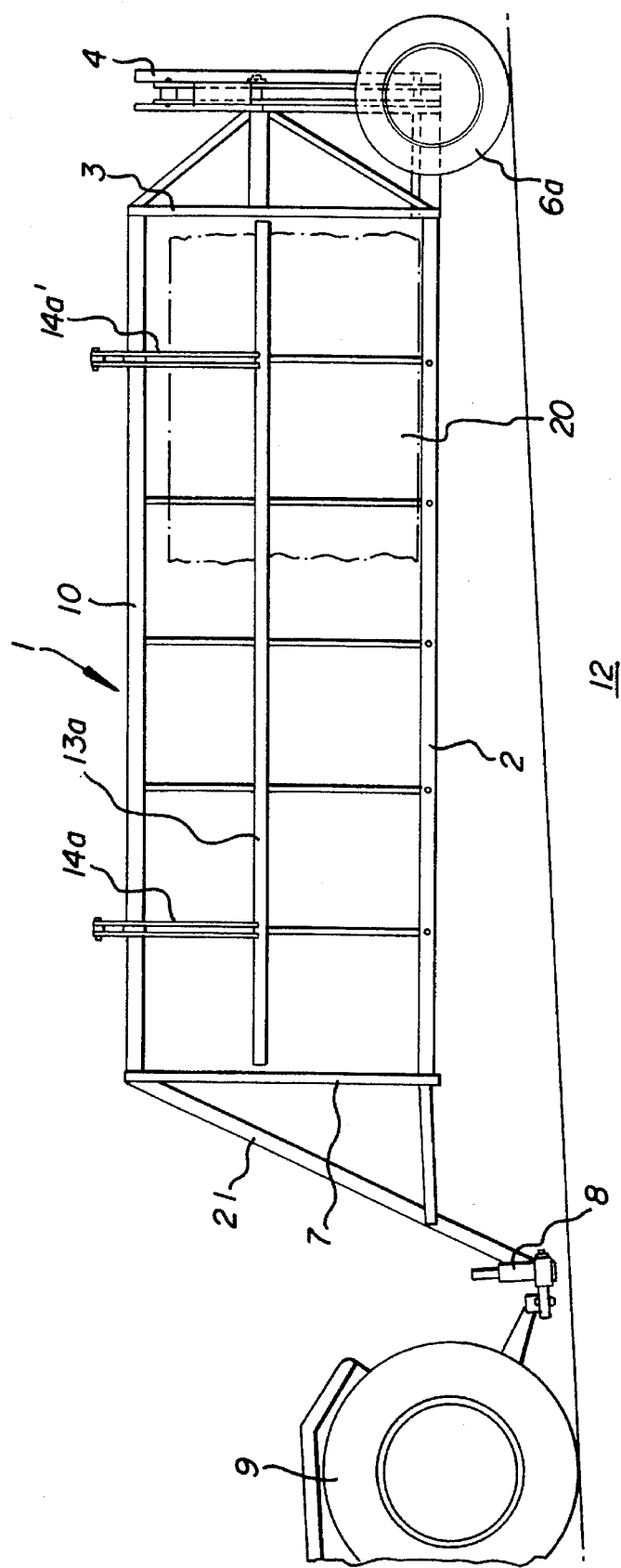
FIG. 1 is a side elevational view of a first embodiment of a bale transporter according to the invention in a transportation position shown coupled to a tractor.
Figure 2:
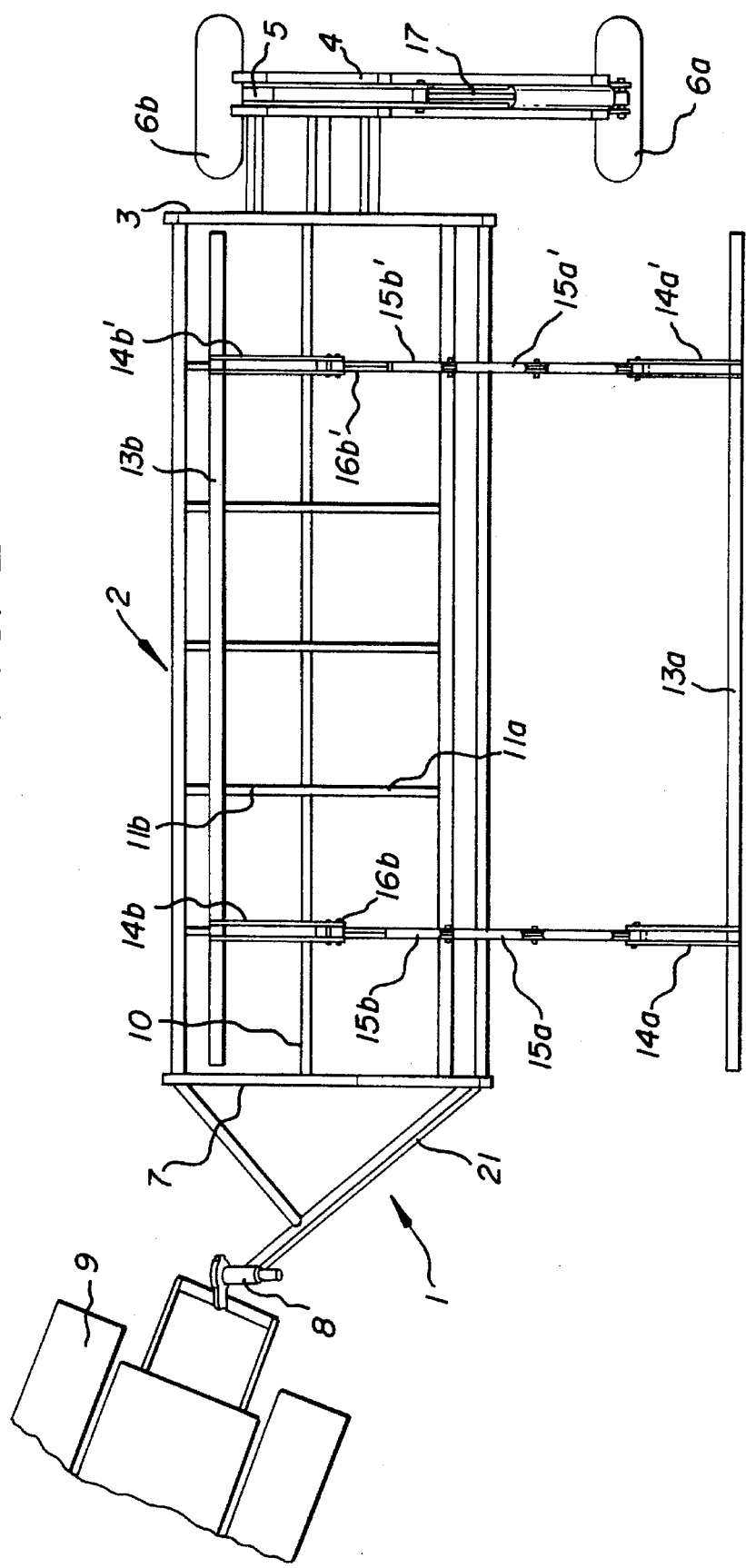
FIG. 2 is a plan view of a transporter according to the invention in a loading/unloading position.
Figure 3:
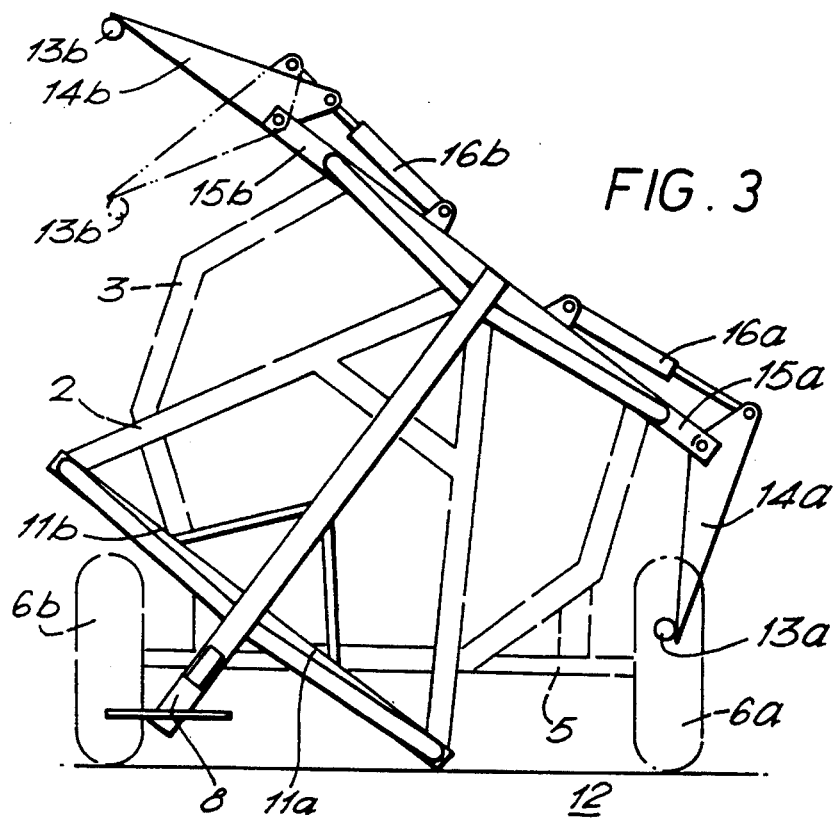
FIG. 3 is a front elevational view of a first embodiment of a transporter according to the invention in a loading/unloading position shown decoupled from the tractor.
Figure 4:
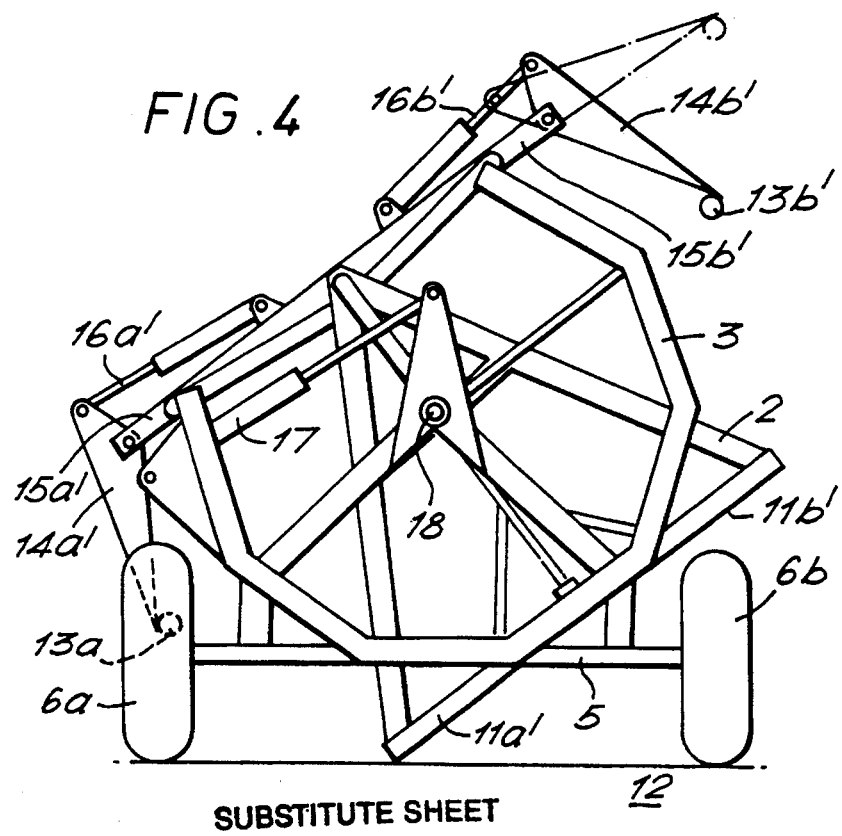
FIG. 4 is a rear elevational view of the transporter of FIG. 3.

The transporter 1 has a support 2 which is in the form of a framework mounted at its rear end 3 via a base member 4 and axle 5 on wheels 6a, 6b so as to be movable. The transporter 1 is provided at its front end 7 with a rotatable coupling 8 via which it may be articulated to a tractor 9. The support 2 is divided longitudinally by a partition framework 10 so as to have two support surfaces 11a, 11b. The support 2 is pivotally mounted at its rear end 3 to the base member 4 so that it may be rotated from the position shown in FIGS. 1 and 5, in which the support surfaces 11a, 11b lie substantially parallel to the ground on which the transporter 1 is positioned, in both a clockwise and anti-clockwise direction so that the support surfaces 11a, 11b are at an angle with respect to the ground 12 on which the transporter 1 is positioned as shown in FIGS. 2, 3 and 4. The transporter 1 has two longitudinally extending loading bars 13a, 13b, each of which is associated with and runs parallel to one of the support surfaces 11a, 11b. In the embodiment shown in FIGS. 3, 4 and 5, each of the loading bars 13a, 13b is pivotally mounted to the support 2 via a respective pair of loading arms 14a, 14a', 14b, 14b', and each loading arm 14a, 14a', 14b, 14b' is pivotally mounted to one of a pair of support arms 15a, 15a', 15b 15b' connected to the partition framework 10. Pairs of piston cylinder systems 16a, 16a', 16b, 16b' are mounted so as to be able to cause the pivoting of the loading arms 14a, 14a', 14b, 14b' away from and towards the support. In a similar fashion a piston cylinder arrangement 17 is mounted on the rear end base member 4 so as to be able to cause pivoting about the longitudinal axis of the entire support 2 around pivot 18. The support 2 is centrally mounted via pivot 18 so that as the support 2 is pivoted the centre of gravity of the support 2 is maintained substantially constant. If pivot 18 were positioned lower with respect to the base member 4, e.g. near the axle 5, upon pivoting of the support 2 its centre of gravity would be swung outwardly which could lead to loss of balance and even complete overturning of the transporter 1. Balance of the front end 7 of the transporter 1 is also important. In the embodiment shown in FIG. 3, when the support 2 is pivoted to the loading/unloading position the centre of gravity moves from a central position over to one side. The transporter 1 may be adapted so as to lessen the shift in the centre of gravity at the front end 7 during pivoting of the support 2.

Further, in order to assist the return of the support to the transportation position, the position of the centre of gravity when the support 2 is in the loading/unloading position shown in FIG. 3 may be altered by a mechanical device, for example by a system of levers, a spring or by a piston/cylinder arrangement, which may be able to assist in the first degrees of pivoting of the support 2. Such devices are preferably associated with the rotatable coupling 8. Bales 20 mounted on the support 2 are shown in dotted outline in FIGS. 1 and 5.

In use the transporter 1 is coupled to a tractor 9 and driven to where the bales for transportation are situated with the support surfaces 11a, 11b in a position substantially parallel to the ground 12 and with rotatable coupling 8 positioned substantially in a horizontal line from the centre of the tractor tyre. In this preferred embodiment, as a bale to be loaded is approached the rotatable coupling 8 is lowered to the position just clear of ground. A pair of loading arm piston cylinders 16a, 16a' on one side of the support 2 is actuated so as to pivot one pair of loading arms 14a, 14a' outwardly so as to raise one of the loading bars 13a. The base member piston cylinder 17 is then actuated to rotate the entire support in a direction towards the bale to be loaded so that the support surface 11a closest to the bale extends at an angle to the ground 12 with its outwardly facing side closest to the ground 12. Due to the geometry of the transporter 1, in particular the bar 21 of the support and the nature and position of rotatable coupling 8 and pivot 18, the front end 7 of the transporter 1 is swung outwardly towards the bale when the support 2 is pivoted while the rear end 3 is swung outwardly away from the bale. The front end 7 can be swung outwards clear of the side of the tractor 9, as is best seen from FIG. 2 of the drawings. The apparatus is then driven forward until the leading edge of the bale to be loaded and the front edge of the transporter 1 are level. The pair of loading arm piston cylinders 16a, 16a' is then reactivated so as to cause the loading arms 14a, 14a' to pivot inwardly thereby allowing loading bar 13a to clamp the bale on to the support surface 11a which is then lifted by rotation of the support 2 via the base member cylinder piston 17 back to the transportation position.

Figure 5:
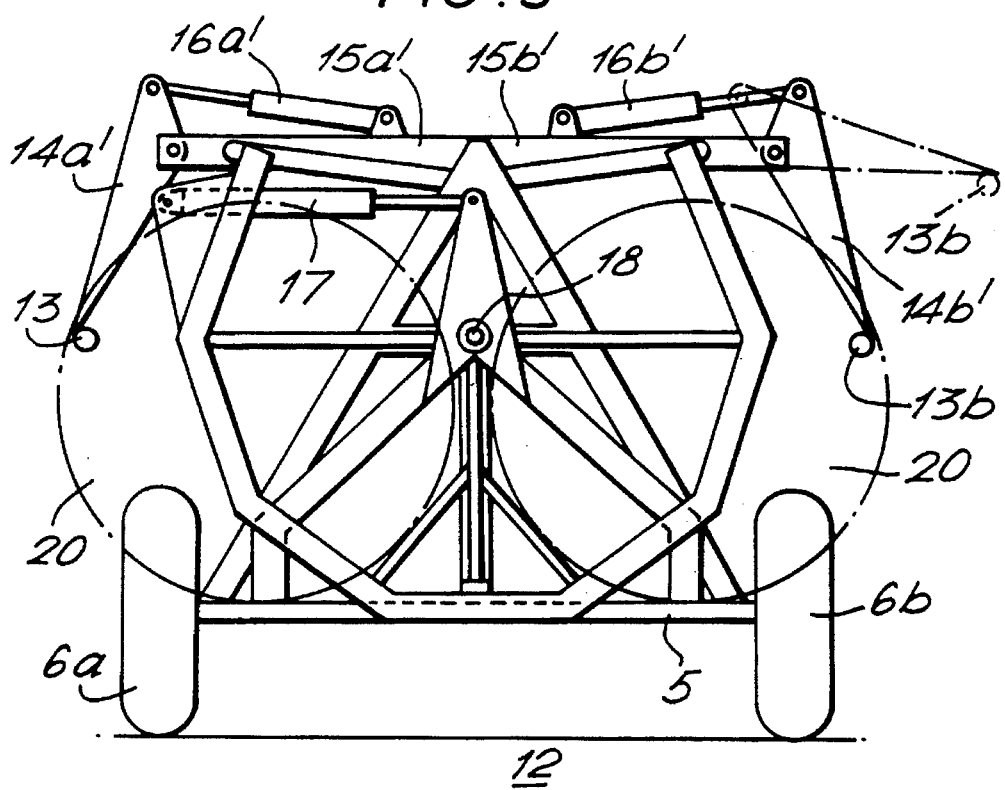
FIG. 5 is a rear elevational view of the transporter of FIGS. 3 and 4 but shown in a transportation position.

Preferably bales are loaded alternately onto the two support surfaces 11a, 11b for balance. The partition framework 10 helps to retain in place bales already loaded on one support surface (e.g. 11a) during loading of further bales on the other support surface (e.g. 11b). FIG. 5 shows in dotted outline two bales loaded one on each of the support surfaces 11a and 11b. The transporter 1 is adapted to carry eight bales—four on each support surface 11a, 11b.

To load each additional bale the machine is driven up to approach the additional bale to be loaded as described above. The front end 7 of the transporter 1 is aligned with the rear edge of the additional bale. The support 2 is then pivoted towards that bale and the relevant loading bar (13a or 13b) raised. The bales previously loaded are now resting back on the ground behind and in line with the additional bale. The transporter 1 is then driven forward until the front end 7 is in line with the front edge of the additional bale. The loading bar (13a or 13b) is then moved downwardly to re-clamp all of the bales and the support 2 re-pivoted to the transportation position. This process is repeated until the maximum number of bales is loaded.

After transportation of the bale or bales, unloading of the transporter is quickly and efficiently carried out by raising each of the loading bars 13a, 13b in turn and causing the support 2 to pivot from one side to the other to allow the bales to roll clear of the machine.

Figure 6:
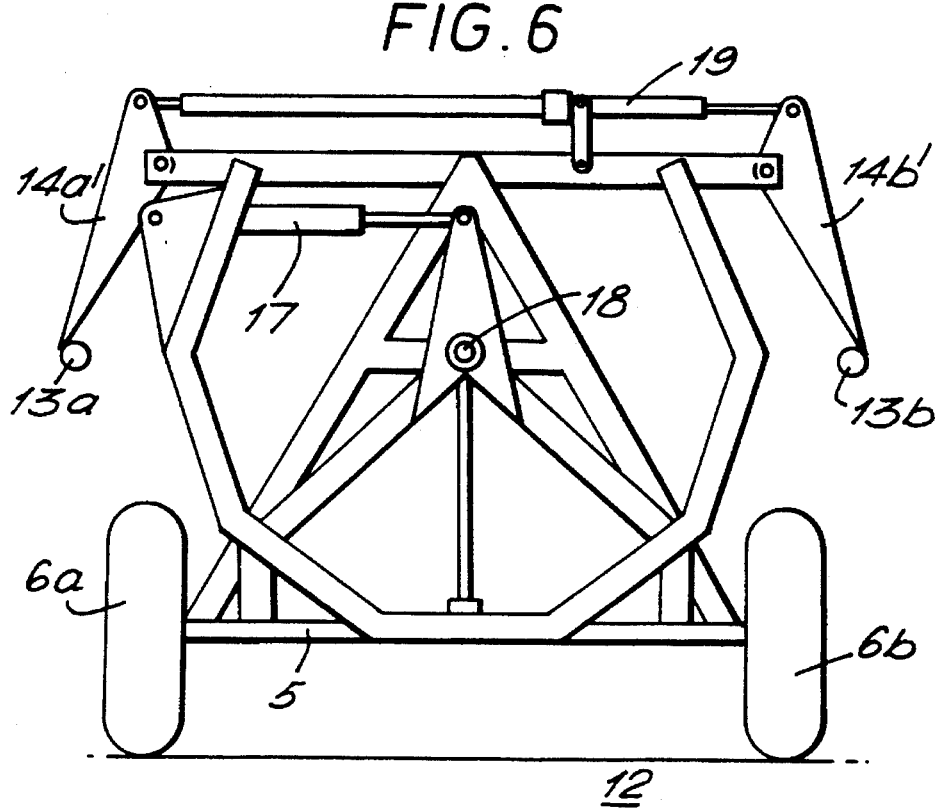
FIG. 6 is a rear elevational view of a second embodiment of a transporter according to the invention.

The embodiment shown in FIG. 6 differs from that shown in FIGS. 3, 4 and 5, in that instead of pairs of piston cylinder arrangements 16a, 16a', 16b, 16b' for pivoting the loading arms 14a, 14a', 14b, 14b' two double-headed piston cylinders (rams) 19 are used. Such an embodiment is also shown in FIG. 2.

Figure 7:
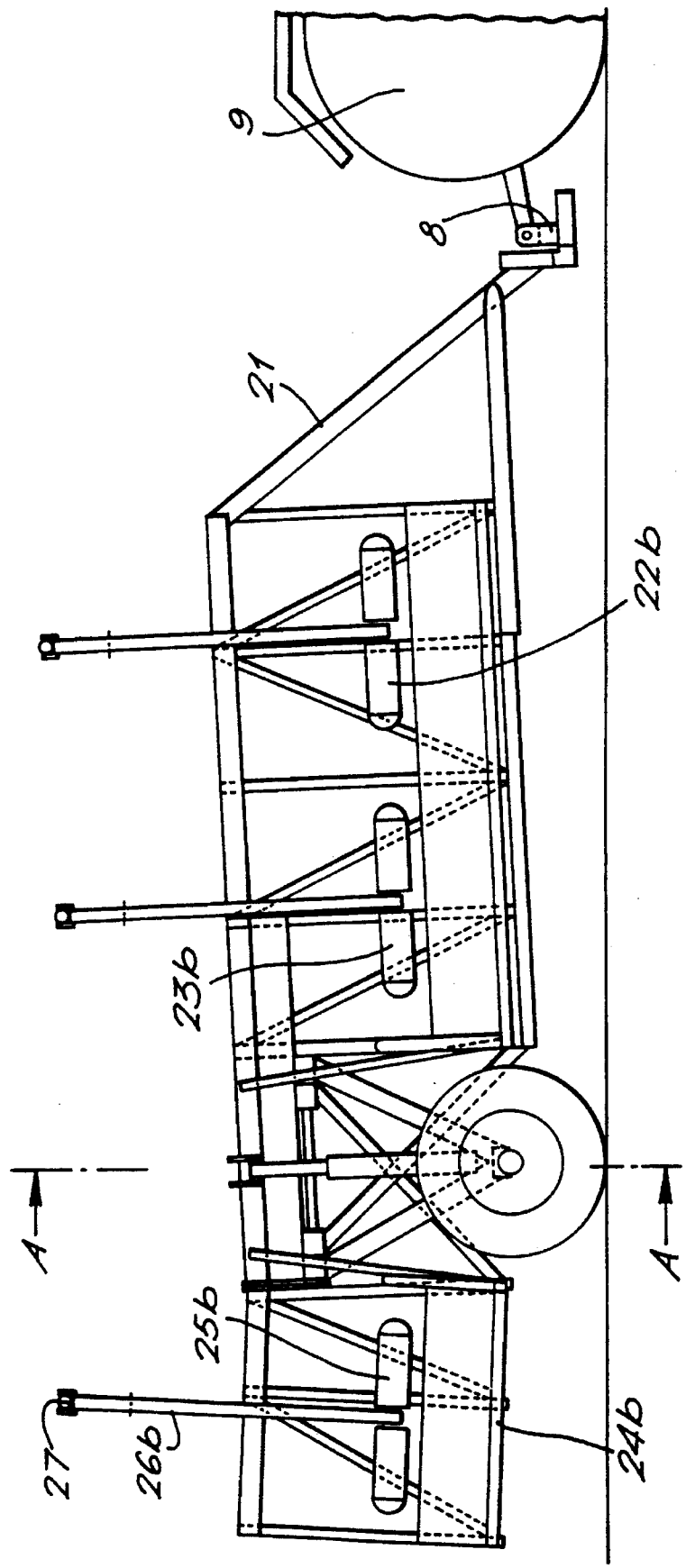
FIG. 7 is a side elevation of a third embodiment of a transporter according to the invention.
Figure 8:
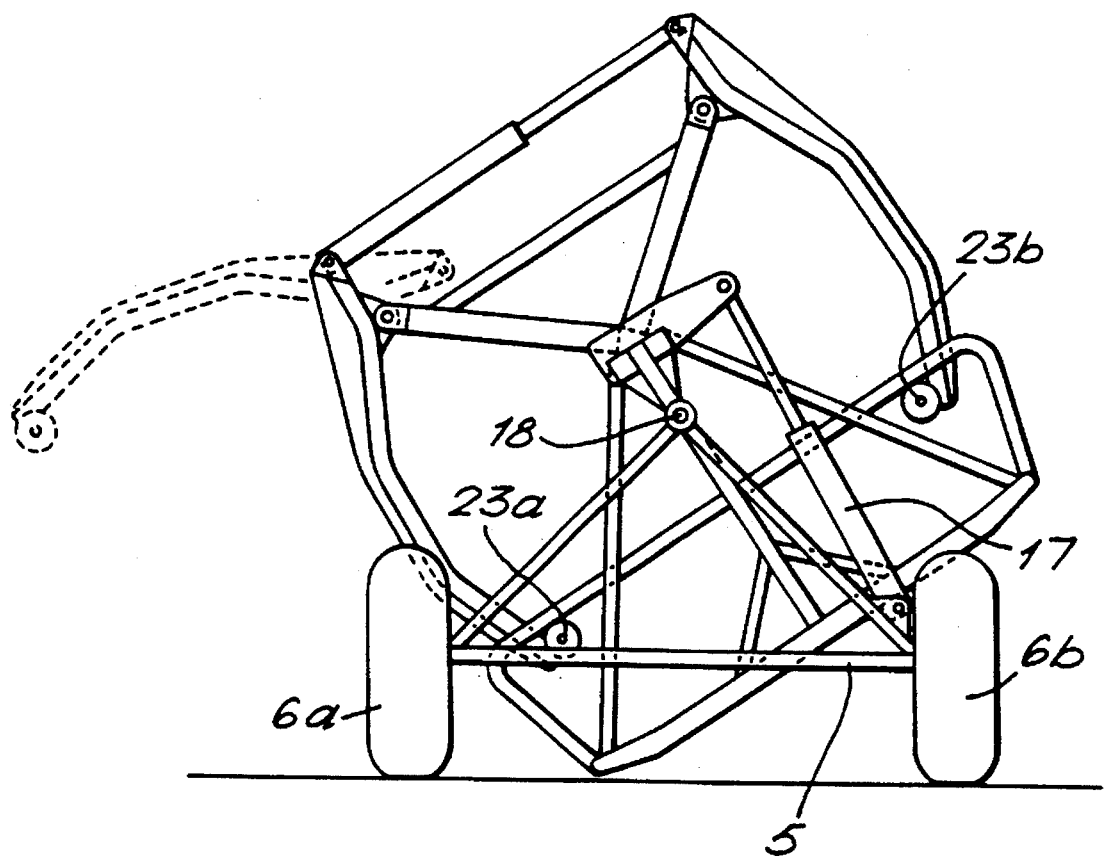
FIG. 8 is a view on line AA in FIG. 7.

A further embodiment of the invention is shown in FIGS. 7 and 8. In this embodiment the single loading bar 13a or 13b for each support surface 11a or 11b has been replaced by individual loading bars 22b, 23a, 23b corresponding to each bale to be loaded. Thus each bale in turn is loaded by clamping it individually to the support surface, starting from the rearmost bale. This obviates the unloading and reclamping of the bales necessary in the use of just one loading bar.

Furthermore this embodiment of the invention has further support surfaces 24b located behind the supporting wheels (6a, 6b) and rear axle 5. These further support surfaces 24a, 24b are provided with associated loading bars 25a, 25b, loading arms 26a, 26b, and piston cylinder 27. The bales are loaded on the rear support surfaces 24a, 24b by reversing the transporter to place the bales in position, and then clamping them.

Figure 9:
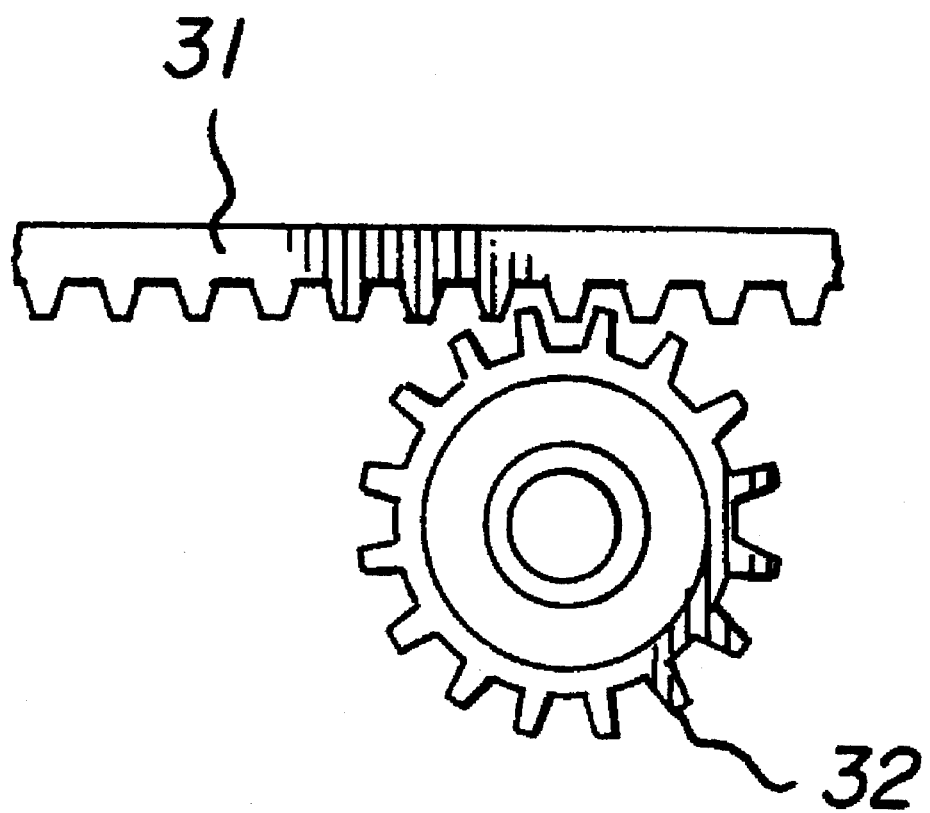
FIG. 9 is a side elevation of the rack and pinion mechanism.

FIG. 9 depicts a rack 31 and pinion 32 which may be substituted for the cylinder piston 17 shown in FIGS. 4–6. Pinion 32 is connected to any suitable driving means (not shown) such as a motor and is used to move support 2 between the first and second positions.

I claim:

1. A bale transporter capable of self-loading and unloading of bales having a front end and a rear end, the bale transporter comprising:

an end frame at the rear end of the bale transporter;

a longitudinally extending support having a front end and a rear end, and being provided with a support surface, the rear end of the support being pivotally mounted to the end frame about a rear pivot point and the front end of the support being pivotally mounted to a rotatable coupling point at the front end of the bale transporter at a front pivot point, the front end of the bale transporter being coupled at the rotatable coupling point to means for supplying power and drive, whereby the support is laterally rotatable in two opposing directions about an axis between the front pivot point and the rear pivot point from a first central transportation position, in which the support is able to support a bale during transportation, to two second loading/unloading positions in which a bale may be loaded onto or unloaded from the support surface; and loading means capable of clamping a bale on the ground to the support when it is in the second position, of holding the bale in position on the support when the support is in the first position, and of releasing the bale when the bale is unloaded from the support in the second position.

2. A bale transporter as claimed in claim 1 further comprising means for moving the support between the first position and each of second positions.

3. A bale transporter as claimed in claim 2 wherein the means for moving the support between the first and second positions comprises a rack and pinion.

4. A bale transporter as claimed in claim 2 wherein the means for moving the support between the first and second positions comprises a piston/cylinder arrangement.

5. A bale transporter as claimed in claim 1 wherein the support is provided with one or more support surfaces, with each support surface being able to support one or a plurality of bales.

6. A bale transporter as claimed in claim 5 wherein the support is divided so as to have two parallel extending support surfaces.

7. A bale transporter as claimed in claim 1 wherein the bale transporter further comprises secondary support means located behind the end frame of the transporter.

8. A bale transporter as claimed in claim 1 wherein the coupling point is vertically movable.

9. A bale transporter as claimed in claim 8 wherein the point is movable from a position at substantially the height of the centre of a tyre of the tractor to a position nearer the ground.

10. A bale transporter as claimed in claim 1 wherein the front end of the support can rotate laterally with respect to the vertical by an angle of 40°–60°.

11. A bale transporter as claimed in claim 1 which is coupled to a means for supplying power and drive at the coupling point at the front end of the bale transporter.

12. A bale transporter as claimed in claim 11 wherein the means for supplying power and drive is a tractor.

13. A bale transporter capable of self-loading and unloading of bales having a front end and a rear end, the bale transporter comprising:

an end frame at the rear end of the bale transporter;

a longitudinally extending support having a front end and a rear end, the rear end of the support being pivotally mounted to the end frame about a rear pivot point and the front end of the support being pivotally mounted to a rotatable coupling point at the front end of the bale transporter about a front pivot point, the front end of the bale transporter being coupled at the rotatable coupling point to means for supplying power and drive, whereby the support is rotatable in a lateral direction about an axis between the front pivot point and the rear pivot point between a first transportation position in which the support is able to support a bale during transportation and a second loading/unloading position in which a bale may be loaded onto or unloaded from the support; and loading means capable of clamping a bale on the ground to the support when it is in the second position, of holding the bale in position on the support when the support is in the first transportation position, and of releasing the bale when the bale is unloaded from the support in the second loading/unloading position, the loading means including one or more loading bars for restraining bales on the support in the second loading/unloading position, and one or more loading arms to support the or each loading bar, the loading arms being pivotally mounted on the support such that each loading bar is movable from a first position to a second position in which it restrains a bale.

14. A bale transporter as claimed in claim 13 wherein each of the one or more support surfaces has at least one loading arm associated with it for loading and unloading a bale onto the support surface when the support is in the second position.

15. A bale transporter as claimed in claim 14 wherein each loading arm is moved by a piston/cylinder arrangement.

16. A bale transporter capable of self-loading and unloading of bales having a front end and a rear end, the bale transporter comprising:

an end frame at the rear end of the transporter;

a longitudinally extending support having a front end and a rear end, the rear end of the support being pivotally mounted to the end frame about a rear pivot point and the front end of the support being pivotally mounted to a rotatable coupling point at the front end of the transporter at a front pivot point which is lower with respect to ground level than the rear pivot point, the front end of the bale transporter being coupled at the rotatable coupling point to means for supplying power and drive, whereby the support is rotatable in a lateral direction about an axis between the front pivot point and the rear pivot point between a first transportation position in which the support is able to support a bale during transportation and a second loading/unloading position in which a bale may be loaded onto or unloaded from the support; and loading means capable of clamping a bale on the ground to the support when it is in the second position, of holding the bale in position on the support when the support is in the first position, and of releasing the bale when the bale is unloaded from the support in the second position.

17. A bale transporter as claimed in claim 16 further comprising means for moving the support between the first transportation position and the second loading/unloading position.

18. A bale transporter as claimed in claim 17 wherein the means for moving the support between the first and second positions comprises a rack and pinion.

19. A bale transporter as claimed in claim 17 wherein the means for moving the support between the first and second positions comprises a piston/cylinder arrangement.

20. A bale transporter as claimed in claim 16 wherein the support is provided with one or more support surfaces, with each support surface being able to support one or a plurality of bales.

21. A bale transporter as claimed in claim 20 wherein the support is divided so as to have two parallel extending support surfaces.

22. A bale transporter as claimed in claim 20 wherein each of the one or more support surfaces has at least one loading arm associated with it for loading and unloading a bale onto the support surface when the support is in the second position.

23. A bale transporter as claimed in claim 22 wherein each loading arm is moved by a piston/cylinder arrangement.

24. A bale transporter as claimed in claim 16 wherein the loading means includes one or more loading bars for restraining bales on the support in the second position and one or more loading arms to support the or each loading bar, the loading arms being pivotally mounted on the support such that each loading bar is movable from a first position to a second position in which it restrains a bale.

25. A bale transporter as claimed in claim 1 wherein the support, when it is in the second position, is positioned such that round hay bales can be rolled onto or off of the support.

26. A bale transporter as claimed in claim 13 wherein the support, when it is in the second position, is positioned such that round hay bales can be rolled onto or off of the support.

27. A bale transporter as claimed in claim 16 wherein the support, when it is in the second position, is positioned such that round hay bales can be rolled onto or off of the support.

* * * * *